United States Patent
Iraudo

(10) Patent No.: US 8,050,842 B2
(45) Date of Patent: Nov. 1, 2011

(54) METHOD AND APPARATUS FOR CONTROLLING AND REGULATING A ROTORCRAFT TURBINE ENGINE

(75) Inventor: Lionel Iraudo, Saint Cannat (FR)

(73) Assignee: Eurocopter, Marignane Cedex (FR)

( * ) Notice: Subject to any disclaimer, the term of this patent is extended or adjusted under 35 U.S.C. 154(b) by 726 days.

(21) Appl. No.: 12/142,819

(22) Filed: Jun. 20, 2008

(65) Prior Publication Data

US 2008/0319629 A1    Dec. 25, 2008

(30) Foreign Application Priority Data

Jun. 20, 2007 (FR) ...................................... 07 04399

(51) Int. Cl.
*G06F 19/00* (2011.01)
(52) U.S. Cl. ............ 701/100; 701/8; 701/101; 340/945; 73/112.01
(58) Field of Classification Search .................. 701/3, 4, 701/100, 101, 8, 123; 340/945, 959; 73/112.01
See application file for complete search history.

(56) References Cited

U.S. PATENT DOCUMENTS

| 4,619,110 A | 10/1986 | Moore |
| 4,787,053 A | 11/1988 | Moore |
| 5,403,155 A * | 4/1995 | Head et al. ...................... 416/25 |
| 7,198,223 B2 * | 4/2007 | Phelps et al. ............... 244/17.11 |

FOREIGN PATENT DOCUMENTS

| DE | 41 25 372 C1 | 8/1992 |
| EP | 0 286 120 A2 | 10/1988 |
| FR | 2 356 210 A | 1/1978 |

* cited by examiner

*Primary Examiner* — Gertrude Arthur Jeanglaude
(74) *Attorney, Agent, or Firm* — Brooks Kushman P.C.

(57) ABSTRACT

The present invention relates to a method and to an apparatus (9) for controlling and regulating a rotorcraft turbine engine (1). The apparatus is provided with an electronic control and regulation computer (3) that receives signals relating to monitored parameters of the turbine engine (1). The apparatus is remarkable in that it is provided with an alarm (4) controlled by the electronic computer (3) via an analog connection (8) to operate whenever an event occurs that might diminish the safety of the rotorcraft.

9 Claims, 1 Drawing Sheet

METHOD AND APPARATUS FOR CONTROLLING AND REGULATING A ROTORCRAFT TURBINE ENGINE

The present invention relates to a method and to an apparatus for controlling and regulating a turbine engine, and more particularly a helicopter engine.

BACKGROUND OF THE INVENTION

Rotorcraft are generally provided with at least one free-turbine engine. Power is then taken from a low pressure stage of each free turbine, which stage rotates at a speed in the range 20,000 revolutions per minute (rpm) to 50,000 rpm.

Thereafter, a speed-reduction gearbox is needed to connect the free turbines to the main lift and propulsion rotor, since the speed of rotation of such a rotor lies substantially in the range 200 rpm to 400 rpm: this gearbox is the main transmission gearbox.

Thermal limits on turbine engines and torque limits on main transmission gearboxes then enable three ratings to be defined for normal utilization of a turbine engine:
  a takeoff rating that can be used for five to ten minutes, corresponding to a torque level for the main transmission gearbox and heating of each turbine engine that can both be accepted for a limited length of time without significant deterioration, this is the maximum takeoff power (PMD) rating;
  a maximum continuous power rating during which capabilities are not exceeded, neither the capabilities of the main transmission gearbox, nor the capabilities associated with the maximum acceptable continuous heating upstream of the high pressure blades of the first stage of each free turbine: this is the maximum continuous power (PMC) rating; and
  a maximum transient power rating that is set by regulation: this is referred to as the maximum transient power (PMT) rating.

The engine manufacturer then determines the limits of each turbine engine so as to obtain an acceptable lifetime and a guaranteed minimum power for each of the above-mentioned ratings, where the guaranteed minimum power corresponds in particular to the power that can be developed by a turbine engine that is old, i.e. a turbine engine that is at the end of its recommended maximum utilization time.

These limits are generally monitored by monitoring three parameters of the turbine engine: the speed of rotation of the engine gas generator; the driving torque; and the ejection temperature of the gas at the inlet to the free turbine of the turbine engine, these three monitored parameters being written Ng, Cm, and C45 respectively by the person skilled in the art.

Furthermore, recent turbine engines are controlled and regulated by control and regulation apparatus having an electronic regulation computer known to the person skilled in the art as a full-authority digital engine control (FADEC), that serves in particular to determine the position of the fuel supply throttle as a function firstly of a regulation loop comprising a primary loop based on maintaining the speed of the rotation of the rotorcraft rotor, and secondly a secondary loop based on a setpoint value for a piloting parameter.

A FADEC also receives signals relating firstly to the monitored parameters of the turbine engine it controls, and secondly monitored parameters concerning important members of the rotorcraft such as the speed of rotation of the main lift and propulsion rotor, for example.

The FADEC then uses a digital connection to deliver these monitored parameter values to a display system of the control and regulation apparatus, which display system is arranged in the cockpit of the aircraft.

With reference to document FR 2 749 545, the display system may include a first limitation instrument that identifies and displays a parameter that constitutes a limiting parameter, specifically that one of the monitored parameters that is the closest to its respective limit.

It should be observed that the FADEC may optionally determine which parameter is the limiting parameter, with the first limitation instrument then serving for display purposes only.

Finally, the FADEC is capable of triggering various alarms if incidents should occur, a minor failure, or a total failure of fuel regulation to the turbine engine, for example.

Furthermore, the FADEC sends information to the display system via a digital connection in the event of a monitored parameter of the turbine engine exceeding a limit that has been predetermined by the manufacturer.

Consequently, the control and regulation apparatus includes a display system, sometimes referred to as an "avionics system", together with an electronic regulation computer, the electronic regulation computer serving simultaneously: to regulate the turbine engine; to deliver information via a digital connection to the display system for the pilot; and to monitor parameters of the turbine engine.

In addition, for reasons of safety and in order to achieve a fault occurrence rate that complies with aviation requirements, the control and regulation apparatus is also provided with sensors connected via emergency analog connections to emergency instruments, e.g. displaying the speed of rotation of the engine gas generator, the driving torque, the gas ejection temperature at the inlet to the free turbine of the engine, or indeed the speed of rotation of said free turbine.

Thus, a failure in the digital connection of the FADEC or of the display system is compensated by an emergency analog connection together with emergency instruments.

Nevertheless, that known architecture for the control and regulation apparatus makes use both of a FADEC connected via a digital connection to a display system, and of a plurality of sensors connected to emergency instruments via analog connections. It will readily be understood that such an architecture is particularly burdensome to implement, since it requires numerous analog cables to be taken all the way to the cockpit.

In addition, the cockpit needs to have enough space to receive certain emergency instruments for each turbine engine.

Finally, the magnitude and the number of analog cables presents a cost that is not negligible in terms of weight, given that the distance between the turbine engines and the rotorcraft cockpit is often considerable.

BRIEF SUMMARY OF THE INVENTION

An object of the present invention is to propose a method and apparatus for controlling and regulating a rotorcraft turbine engine that overcomes the above-mentioned limitations and does not require emergency instruments to be implemented that are connected by emergency analog connections to optionally-dedicated sensors of the turbine engine.

According to the invention, apparatus for controlling and regulating a rotorcraft turbine engine is provided with an electronic control and regulation computer that receives signals relating to monitored parameters of a turbine engine of the rotorcraft. The control and regulation apparatus is remarkable in that it is provided with alarm means controlled by the electronic computer via an analog connection to operate when an event occurs that might diminish the safety of said rotorcraft, or indeed when it is necessary to undertake a maintenance action on the turbine engine.

Thus, depending on the signals it receives, relating to the speed of rotation of the turbine engine gas generator, to the driving torque, and to the gas ejection temperature at the inlet to the free turbine of the turbine engine, or indeed to counters for managing components of the engine that present limited lifetimes, the electronic computer activates the alarm means by using an analog connection.

Via such a particularly reliable analog connection, the electronic computer and the alarm means can ensure that events that might compromise the reliability or the safety of the turbine engine will be detected securely, thereby ensuring that a catastrophic event does not occur, and thus making it pointless to use emergency instruments.

Advantageously, the alarm means are visual means arranged in the cockpit of the rotorcraft, e.g. an indicator lamp. Nevertheless, the alarm means could also consist in audible means.

Furthermore, in a variant, it is possible to envisage the control and regulation apparatus including at least one display system that receives in particular information relating to the monitored parameters in order to display the value of a limiting parameter, for example. The display system is then connected to the electronic computer via first and second digital connections.

Having redundant digital connections considerably reduces the rate at which failures occur, thereby contributing to being able to eliminate emergency instruments.

Advantageously, the alarm means, connected to the electronic computer via an analog connection independent of the first and second digital connections can then include an indicator light integrated in the display system.

Such a configuration makes it possible to further reduce the space occupied in the rotorcraft cockpit, since it no longer needs emergency instruments or an additional indicator lamp. The usual display system is connected via digital connections to the electronic computer and it also incorporates the alarm means that are connected to said computer via a single analog connection.

Under such conditions, the alarm means are activated when a maintenance action needs to be undertaken on the turbine engine. It is explained below that the computer monitors at least one counter for managing a component of the turbine engine that presents limited lifetime, in order to determine whether a limited-lifetime part of the turbine engine need to be replaced. The management counters that are monitored may comprise a conventional counter for counting the number of cycles performed by the high pressure turbine of the engine, a conventional counter for counting the number of cycles performed by the free turbine of the engine, a conventional counter for counting the number of cycles performed by the injection wheels of the engine, or indeed a conventional counter for counting the number of flight hours performed by the engine.

It should be observed that until now, a rotorcraft pilot has had to enter the above-mentioned cycles in an appropriate maintenance log book so that they can be taken into consideration when verifying whether maintenance actions need to be undertaken. This task is now taken over by the electronic computer that warns the crew if a maintenance action is required.

Furthermore, the alarm means are preferably activated whenever the turbine engine is used in abnormal manner, i.e. outside its certified utilization ratings.

Consequently, if a monitored parameter of the turbine engine exceeds its limit or if a utilization rating of the engine is used abusively, then the electronic computer warns the pilot via the alarm means.

Thus, the control and regulation apparatus is particularly active since it does not merely display parameter values, but it also monitors those parameters and their respective limits in order to verify that flight is taking place normally and that there is no risk of an incident occurring.

Under such conditions, the power unit is well controlled and there is no need to implement emergency connections connected to emergency instruments that make a rotorcraft considerably heavier because of the presence of numerous electrical harnesses.

The present invention also provides a method of controlling and regulating a rotorcraft turbine engine that is suitable for being implemented by apparatus of the invention for controlling and regulating a rotorcraft turbine engine and having an electronic control and regulation computer that receives signals relating to monitored parameters of a turbine engine of said rotorcraft.

In the method, the control and regulation apparatus includes alarm means, and the alarm means are controlled by the electronic computer via an analog connection when an event occurs that might diminish the safety of the rotorcraft.

More precisely, the electronic computer monitors at least one counter for managing a limited-lifetime component of the turbine engine, the computer activating the alarm means in the event of said management counter reaching a predetermined threshold.

For safety reasons, the apparatus includes a display system arranged in a cockpit of the rotorcraft and the electronic computer sends a message to the display system via at least one digital bus so that the display system informs the pilot that the management counter has reached said predetermined threshold.

Similarly, the electronic computer advantageously activates the alarm means when the turbine engine is used in abnormal manner, i.e. outside the prescribed utilization ratings.

For safety reasons, the apparatus includes a display system arranged in a cockpit of the rotorcraft, and the electronic computer sends a message to the display system via at least one digital bus so that the display system can inform the pilot that the turbine engine is being used in abnormal manner.

In the method, the electronic computer receives analog type signals relating to monitored parameters and it then processes said analog type signals relating to monitored parameters in order to determine whether an event has occurred that might diminish the safety of the rotorcraft. During said processing, the electronic computer then determines firstly whether said counter for managing a limited-lifetime component of the turbine engine has reached a predetermined threshold, and secondly whether said turbine engine has been used in abnormal manner.

In the affirmative, said electronic computer activates said alarm means via an analog connection.

Thus, the pilot is informed by two different means that a maintenance action needs to be under-taken on the turbine engine. The engine is thus well monitored, thereby guaranteeing proper operation.

In addition, on the ground, the following steps are performed when the electronic computer is switched on:

a) the electronic computer simulates activating one of the power ratings of the turbine engine, advantageously the take-off power (PMD) rating of the turbine engine;

b) the electronic computer simulates a value for a monitored parameter of the turbine engine, said value being above a predetermined limit;

c) it is verified that the display system, arranged in the cockpit and connected to the electronic computer via a digital connection, does indeed indicate that said value is greater than said limit; and d) it is verified that said alarm means have been activated by the electronic computer.

Thereafter, the electronic computer performs a test on starting in order to verify that the various elements of the control and regulation apparatus are operating properly. If they are not, the rotorcraft will not be flown.

BRIEF DESCRIPTION OF THE DRAWING

The invention and its advantages appear in greater detail from the following description of an embodiment given by way of illustration with reference to the sole accompanying FIGURE.

The sole FIGURE is a block diagram of a control and regulation apparatus 9 for a rotorcraft turbine engine.

DETAILED DESCRIPTION OF THE INVENTION

Figure 1:
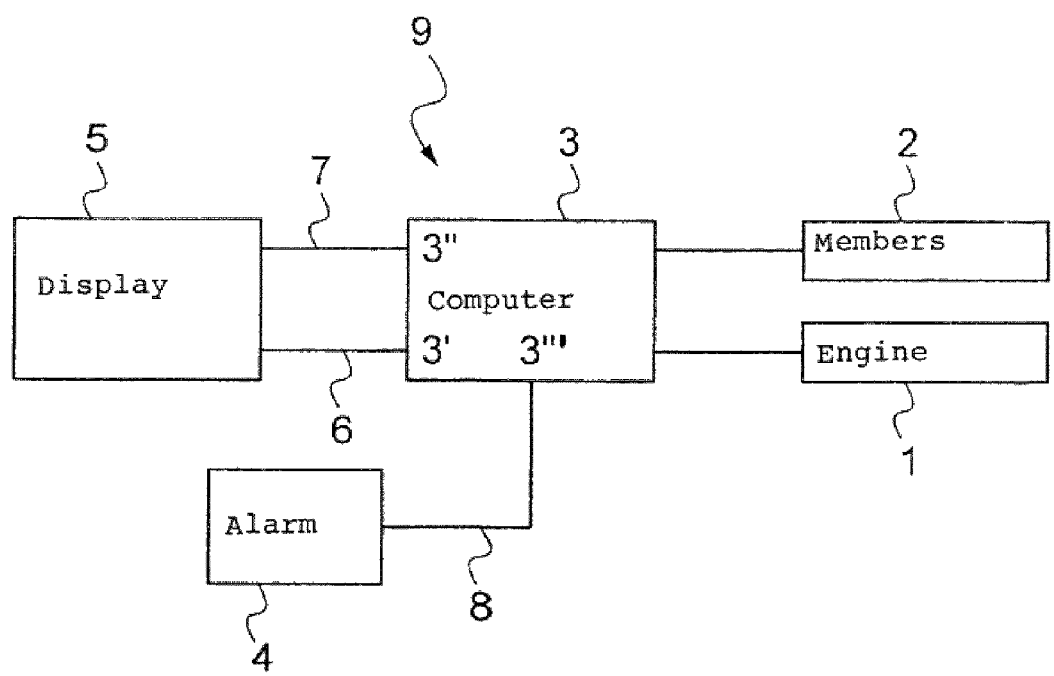

The control and regulation apparatus 9 comprises an electronic control and regulation computer 3, a display system 5, and alarm means 4.

The electronic computer 3 receives signals relating to the turbine engine 1 of a rotorcraft. It also receives signals from other members 2 of the rotorcraft, for example a signal representative of the speed of rotation of the lift and propulsion rotor of the rotorcraft.

With the help of this information, the electronic computer 3 regulates the turbine engine and delivers information to the display system 5 which optionally includes a first limitation indicator. For safety reasons, the electronic computer 3 possesses first and second digital outputs 3' and 3' for transmitting this information to the display system 5 via first and second digital connections 6 and 7.

The redundancy in the digital connections thus increases the reliability of the control and regulation apparatus, the loss of one digital link being compensated by the presence of another digital link.

Furthermore, if an event occurs that might diminish the safety of the rotorcraft or prohibit the rotorcraft from flying, where prohibiting from flying corresponds either to interrupting a current flight, or else to prohibiting flying and thus prohibiting takeoff, depending on the moment when the event occurs, the electronic computer 3 operates the alarm means 4 via an analog connection 8, said analog connection being connected to an analog output 3''' of the electronic computer 3 and to the alarm means 4.

This analog connection then represents redundancy that is independent of the first and second digital connections 6 and 7.

Consequently, the warning apparatus, provided with the analog connection 8, the alarm means 4, and the display system 5 presents architecture that is robust and particularly safe.

Activating the alarm means 4, e.g. an indicator light, under the control of the electronic computer 3 thus makes it possible to using an emergency connection connected to the emergency instruments.

Consequently, instruments of this type and the associated emergency electrical connections are no longer required with the control and regulation apparatus of the invention, thereby achieving a non-negligible weight saving.

Furthermore, the electronic computer 3 activates the alarm means 4 via the analog connection 8 when a maintenance operation needs to be performed on the turbine engine.

The turbine engine includes several mechanical parts that present limited lifetime. At the end of its lifetime, the mechanical part in question must be replaced. For example, the number of cycles of the high pressure turbine, of the free turbine, and of the injection wheels are respectively limited to 15,000, 10,000, and 8,000, with damage being limited to 100%.

The electronic computer then keeps track of these various cycles of damage to the turbine engine, and of the number of flight hours performed by the turbine engine by using management counters.

If a management counter for a part of the turbine engine reaches a predetermined threshold, for example 15,000 for the high pressure turbine management counter, then the electronic computer 3 activates the alarm means 4.

The electronic computer 3 is thus not a passive element but rather an element that is particularly active since it increments the management counters for determined parts and monitors those management counters to determine whether said parts have reached the ends of their lifetimes.

By way of example, activation of the alarm means 4 leads to the rotorcraft being prohibited from flying until the part concerned has been replaced.

If the alarm means 4 is triggered while in flight, the pilot might shorten the flight in order to avoid having to face a failure. Nevertheless, it is advantageous for the alarm means 4 to be activated before the lifetime of a turbine engine part has been reached.

Consequently, it is possible to envisage the electronic computer 3 activating the alarm means 4 in anticipation so as to create a margin that is sufficient to enable a maintenance operation to be performed early. For example, as a function of the turbine engine and of the rotorcraft, the predetermined threshold at which the electronic computer activates the alarm means lies either: 50 cycles before the maximum limit of a cycle counter; 5 hours before the maximum limit of the management counter that counts the number of flight hours of the turbine engine; or 2% before the maximum limit of the damage counter. Nevertheless, if the alarm means is activated while in flight, the pilot can still consider terminating the mission.

It should be observed that the assembly comprising the analog connection 8 and the alarm means 4 is reliable. Nevertheless, to maximize safety, the electronic computer 3 also transmits information to the display system via the first and second digital connections 6 and 7 indicating that a maintenance action needs to be undertaken. Consequently, this fact is signaled to two entities of the control and regulation apparatus, specifically the display system 5 and the alarm means 4.

With the help of the alarm means 4, an operator does not need to consult a plurality of documents such as a log book in order to determine whether a maintenance action needs to be carried out on the turbine engine, since the alarm means 4, and possibly the display system 5, give this information when maintenance action is required.

Since the maintenance that is to be performed is clearly indicated by means that are independent and redundant, the risk of failure is reduced, thereby making it pointless to use emergency connections and emergency instruments.

Similarly, the electronic computer 3 activates the alarm means 4 when the turbine engine is being used in abnormal manner.

A plurality of power ratings are defined for the turbine engine, each rating specifying limits that the engine-monitoring parameters must riot exceed. Usually, the engine-monitoring parameters are: the speed of rotation Ng of the turbine engine gas generator; the driving torque Cm; and the gas ejection temperature T45 at the inlet to the free turbine of the engine.

For example, as a general rule, the takeoff rating must be used for no more than 5 minutes, while the maximum transient power rating can generally be used for no more than 20 seconds.

If one of the engine-monitoring parameters lies between its maximum limit for the maximum continuous power rating and its maximum limit for to takeoff rating, then the electronic computer 3 deduces that the turbine engine is being operated at takeoff rating.

Thereafter, if this situation lasts for more than 5 minutes, or for a duration longer than the maximum utilization time for the takeoff rating, then the electronic computer 3 activates the alarm means 4.

Similarly, if one of the engine-monitoring parameters lies between its maximum limit for takeoff rating and its maximum limit for maximum transient power rating, then the electronic computer 3 deduces that the turbine engine is operating at its maximum transient power rating. Thereafter, if this situation lasts for longer than 20 seconds, i.e. a duration longer than the maximum utilization time for the maximum transient power rating, then the electronic computer 3 activates the alarm means 4.

Consequently, the electronic computer 3 activates the alarm means 4 if an engine-monitoring parameter lies between its low limit and its high limit for a given power rating of the turbine engine during a length of time that is longer than the utilization time of said given power rating.

The pilot is thus informed that the turbine engine is being used abusively. The pilot might then reduce engine power in order to avoid damaging the engine or the main gearbox.

These units will then operate within the limits set by the manufacturer. The reliability obtained in this way then makes it pointless to implement emergency instruments.

In addition, in order to maximize safety, the electronic computer 3 also transmits to the display system 5, via the first and second digital connections 6 and 7, information to the effect that the turbine engine is operating at levels above the levels that are authorized.

Consequently, this is signaled to two entities of the control and regulation apparatus 9, i.e. the display system 5 and the alarm means 4.

Finally, in the method implemented by the control and regulation apparatus 9, the apparatus can warn the rotorcraft pilot in the event of "undetected" failures.

Depending on the problem concerned, the display system can operate and give wrong information to the pilot. The pilot might then believe that the engine is being used within its authorized limits, whereas in fact the pilot is loading the engine with powers that are not authorized.

Such a undetected failure is particularly dangerous since the pilot will believe the wrong information without having any grounds for suspecting the presence of a failure.

Consequently, on the ground, during a step a), the electronic computer 3 simulates activation of a power rating for the turbine engine, e.g. takeoff rating.

During a step b), the electronic computer 3 simulates a value for a monitoring parameter, said value being above a predetermined limit. For example, the electronic computer 3 simulates a gas ejection temperature T45 greater than the maximum limit for said gas ejection temperature T45 when operating at takeoff rating.

Under such circumstances, the electronic computer 3 needs to send information to the display system to indicate that the maximum limit for gas ejection temperature T45 has been exceeded. Similarly, it should normally activate the alarm means 4.

Thereafter, during steps c) and d), an operator, e.g. the pilot, verifies firstly that the display system is indeed indicating that the maximum limit for the gas ejection temperature T45 has been exceeded, and secondly that the alarm means have indeed been activated.

If so, then the operator, or the apparatus operating automatically, can deduce that the information indicated by the display system 5 and the alarm means 4 is coherent and true. It can therefore be deduced that there is no undetected failure.

This test procedure makes it possible to ensure that the control and regulation apparatus is operating properly. Once this point has been confirmed, it is not essential for the rotorcraft to be fitted with other items of equipment, such as emergency instruments.

Naturally, the present invention is capable of numerous variations as to its implementation. Although an embodiment is described above, it will readily be understood that it is not conceivable to identify exhaustively all possible embodiments. Naturally, it is possible to envisage replacing any of the means described by equivalent means, without thereby going beyond the ambit of the present invention.

For example, it is possible to envisage integrating the alarm means 4 in the display system 5. A portion of the resulting system then includes the display system 5 as such while another portion is fitted with the alarm means 4.

This variant makes it possible to optimize the space occupied by the apparatus in the cockpit of a rotorcraft.

What is claimed is:

1. Apparatus for controlling and regulating a turbine engine of a rotorcraft, the apparatus comprising:
   an electronic computer configured to receive and process signals relating to monitored parameters of said turbine engine in order to determine whether an event has occurred that may diminish safety of the rotorcraft, the electronic computer including a counter for counting cycles of use of a component of the turbine engine; and
   an alarm connected to said electronic computer via an analog connection independent of any digital connection;
   wherein said electronic computer activates said alarm via the analog connection when a maintenance action needs to be undertaken on said turbine engine based on the counter reaching a predetermined threshold and when said turbine engine is used in abnormal manner according to the monitored parameters of the turbine engine.

2. Apparatus according to claim 1, wherein said alarm includes an indicator lamp arranged in a cockpit of said rotorcraft.

3. Apparatus according to claim 1, including at least one display system that receives from the electronic computer information relating to said monitored parameters via first and second digital connections independent of the analog connection.

4. Apparatus according to claim 3, wherein said alarm is integrated in said display system.

5. A method of controlling and regulating a turbine engine of a rotorcraft, the method being suitable for being implemented by apparatus for controlling and regulating a rotorcraft turbine engine and including an electronic computer configured to receive and process signals relating to monitored parameters of said turbine engine in order to determine whether an event has occurred that may diminish safety of the rotorcraft, said control and regulation apparatus including an alarm connected to said electronic computer via an analog connection independent of any digital connection;
   wherein said electronic computer includes at least one management counter for counting cycles of use of a limited-lifetime component of the turbine engine, said electronic computer activates said alarm via the analog connection when a maintenance action needs to be undertaken on said turbine engine based on said management counter reaching a predetermined threshold and when said turbine engine is used in abnormal manner according to the monitored parameters of the turbine engine.

6. A method according to claim 5, wherein said apparatus includes at least one display system arranged in a cockpit of said rotorcraft, said electronic computer sending a message to said display system via digital bus so that the display system informs the pilot that said management counter has reached said predetermined threshold.

7. A method according to claim 5, wherein said apparatus includes at least one display system arranged in a cockpit of said rotorcraft, and said electronic computer sends a message to said display system (5) via a digital bus so that the display system informs the pilot that said turbine engine is being used in abnormal manner.

8. A method according to claim 5, wherein, on the ground, the following steps are performed when said electronic computer is switched on:
   a) said electronic computer simulates activating a power rating of the turbine engine;
   b) said electronic computer simulates a value for a monitored parameter (Ng, Cm, T45) of said turbine engine, said value being above a predetermined limit for the power rating;
   c) verifying that a display system arranged in a cockpit of the rotorcraft and connected to the electronic computer by a digital connection indicates that said value is above said limit; and
   d) verifying that said alarm is activated by said electronic computer.

9. A method according to claim 8, wherein said power rating is the takeoff power (PMD) rating of the turbine engine.

* * * * *